J. SHELABARGER.
Grain Dampener.
No. 81,016.
Patented Aug. 11, 1868.
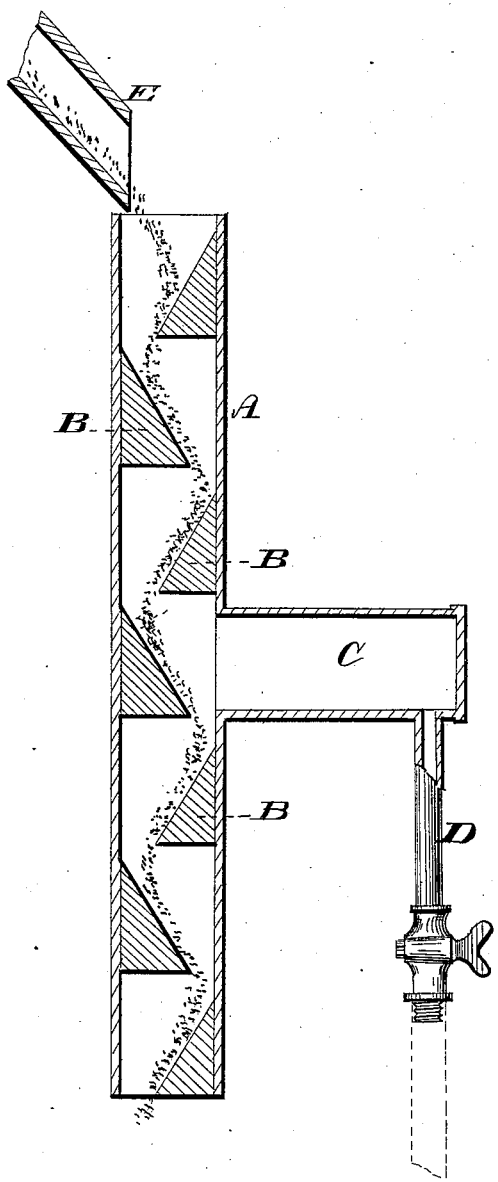

United States Patent Office.

I. SHELLABARGER, OF DECATUR, ILLINOIS.

Letters Patent No. 81,016, dated August 11, 1868.

IMPROVED APPARATUS FOR DAMPENING GRAIN.

The Schedule referred to in these Letters Patent and making part of the same.

TO ALL WHOM IT MAY CONCERN:

Be it known that I, J. SHELLABARGER, of Decatur, in the county of Macon, and State of Illinois, have invented a new and useful Improvement in Apparatus for Dampening Grain; and I do hereby declare that the following is a full, clear, and exact description thereof, which will enable those skilled in the art to make and use the same, reference being had to the accompanying drawings forming part of this specification.

The nature of my invention relates to an arrangement of apparatus for dampening or softening grain, previous to grinding, by the use of steam.

And it consists of a vertical spout or chute, on two opposite inner sides of which is arranged a series of inclined planes, one above another, constituting a zigzag path, down which the grain passes through a volume of steam, which is conveyed into the said spout by any suitable means, as will be more fully seen by reference to the accompanying drawings, in which is shown a vertical elevation of the zigzag spout, with one side removed to show the interior.

A represents a vertical spout, with a series of inclined planes, B, arranged alternately on two opposite sides in the interior of the same.

C represents a lateral chamber communicating with the same, into which the steam is admitted for the purpose of allowing it to expand before coming into contact with the grain.

D is a steam-pipe to convey the steam to the chamber.

E is a spout, for conveying the grain to the vertical zigzag spout A.

After the grain passes through the spout A, it is carried to the grinding-apparatus in any suitable manner.

The operation is fully shown by the drawing.

My improved dampening-device is found in practice to be of very great use in dampening and softening wheat, especially, and other grain before grinding.

It is well known among those skilled in the art, that wheat is often too dry to produce the best results when ground, and is very much improved by being slightly dampened, which my improvement accomplishes very successfully, as the degree of effect upon the grain can be regulated and governed to any extent, by regulating the amount of steam admitted to the grain, through a valve or stop-cock in the supply-pipe.

Heretofore the introduction of steam, in treating grain, has been attended with but little success, from the fact that no means were provided for the full condensation of the steam. It was directed against the grain, as the latter passed, by its own gravity, through an inclined spout, a great portion of the steam escaping upward uncondensed. By my invention, this defect is overcome, as the steam escaping from the chamber C, passes through the grain frequently, and is directed, by the alternate inclines B, against the bottoms or bases of the same, and is fully and completely condensed.

Having thus fully described my improvements, what I claim, and desire to secure by Letters Patent, is—

The spout A, having inclines B B, arranged as shown, when the same is in combination with the steam-chamber or pipe, and is used for conveying grain from the pipe E, or its equivalent, to the grinding-apparatus, substantially as described, as and for the purpose specified.

I. SHELLABARGER.

Witnesses:
WILLIAM S. STUMPER,
EDWIN PARK.